United States Patent
Hodge

(10) Patent No.: US 10,088,848 B2
(45) Date of Patent: Oct. 2, 2018

(54) METHOD AND APPARATUS FOR DISPLAY OF AN IMAGE TO A PILOT OF AN AIRCRAFT

(71) Applicant: BAE Systems plc, London (GB)

(72) Inventor: Steven James Hodge, Lancashire (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/506,929

(22) PCT Filed: Aug. 25, 2015

(86) PCT No.: PCT/GB2015/052451
§ 371 (c)(1),
(2) Date: Feb. 27, 2017

(87) PCT Pub. No.: WO2016/030672
PCT Pub. Date: Mar. 3, 2016

(65) Prior Publication Data
US 2017/0277199 A1    Sep. 28, 2017

(30) Foreign Application Priority Data
Aug. 29, 2014 (GB) .................... 1415283.9

(51) Int. Cl.
*G01C 23/00* (2006.01)
*G05D 1/06* (2006.01)
(Continued)

(52) U.S. Cl.
CPC ......... *G05D 1/0676* (2013.01); *G01C 23/005* (2013.01); *G02B 27/017* (2013.01);
(Continued)

(58) Field of Classification Search
CPC .. G05D 1/0676; G05D 1/0684; G05D 1/0044; G05D 1/101; G01C 21/005;
(Continued)

(56) References Cited

U.S. PATENT DOCUMENTS 3,824,535 A    7/1974    Rover, Jr.
4,368,517 A    1/1983    Lovering
(Continued)

FOREIGN PATENT DOCUMENTS

DE    69906424 T2    1/2004
GB    2004828 A    4/1979
(Continued)

OTHER PUBLICATIONS

Great Britain Search Report for Application No. GB1415281.3, date Jan. 29, 2015, 4 pages.
(Continued)

*Primary Examiner* — Richard A Goldman
(74) *Attorney, Agent, or Firm* — Maine Cernota & Rardin

(57) ABSTRACT

A method for displaying an image to a pilot (20) of an aircraft (2). The method comprises, using a first value of the velocity of the aircraft (2) relative to a runway (4), displaying, on a HMD (24), an indication of a first position for an image component (e.g. a FPM) (36), the first position being the position, from the pilot's point of view, that the image component (36) would occupy if the aircraft (2) was established on a predefined glideslope (16); using a second value different to the first value, displaying, on the HMD (24), an indication of a second position for the image component (36), the second position being the position, from the pilot's point of view, that the image component (36) would occupy if the aircraft (2) was established on a different glideslope.

15 Claims, 5 Drawing Sheets

(51) Int. Cl.
*G08G 5/00* (2006.01)
*G08G 5/02* (2006.01)
*G02B 27/01* (2006.01)

(52) U.S. Cl.
CPC .......... *G08G 5/0021* (2013.01); *G08G 5/025* (2013.01); *G02B 2027/0141* (2013.01); *G02B 2027/0181* (2013.01)

(58) Field of Classification Search
CPC .... G01C 23/00; G01C 23/005; G02B 27/017; G02B 2027/0141; G02B 2027/0181; G08G 5/0021; G08G 5/025; B64D 2045/008; B64D 2045/04; B64D 2045/08
USPC ................ 701/16, 14, 3, 10, 436, 523, 538; 73/178 T; 940/973, 972, 980; 244/183
See application file for complete search history.

(56) References Cited

U.S. PATENT DOCUMENTS

| | | | | |
|---|---|---|---|---|
| 4,419,079 A * | 12/1983 | Georges | ............... | G05D 1/0676 340/973 |
| 4,775,218 A | 10/1988 | Wood | | |
| H628 H * | 4/1989 | McIngvale | ............ | G01C 21/203 342/120 |
| 5,369,589 A * | 11/1994 | Steiner | ................. | G01C 21/203 340/990 |
| 5,593,114 A * | 1/1997 | Ruhl | ................. | G05D 1/0676 244/183 |
| 5,798,713 A * | 8/1998 | Viebahn | ............... | G01C 23/005 340/973 |
| 6,111,526 A * | 8/2000 | Aymeric | ............... | G05D 1/0676 244/181 |
| 6,185,486 B1 * | 2/2001 | Labounsky | ............. | G01S 1/042 340/947 |
| 6,405,107 B1 * | 6/2002 | Derman | ............... | G01C 21/005 340/3.5 |
| 7,605,774 B1 | 10/2009 | Brandt et al. | | |
| 8,209,122 B2 * | 6/2012 | Nichols | ................ | G01C 23/005 701/516 |
| 8,380,369 B2 * | 2/2013 | Geoffroy | ............. | G05D 1/0684 340/945 |
| 8,392,037 B2 * | 3/2013 | Sahasrabudhe | ...... | G05D 1/0676 244/17.13 |
| 8,392,039 B2 * | 3/2013 | He | ......................... | G01C 23/00 701/10 |
| 8,400,330 B2 * | 3/2013 | He | ......................... | G01C 23/00 340/960 |
| 8,581,748 B1 | 11/2013 | Barber | | |
| 8,589,071 B2 * | 11/2013 | Feyereisen | ............. | G08G 5/025 340/972 |
| 8,914,166 B2 * | 12/2014 | He | ....................... | G01C 23/005 701/16 |
| 9,245,450 B1 * | 1/2016 | Chiew | .................. | G05D 1/0676 |
| 9,377,782 B2 * | 6/2016 | Puyou | .................... | G08G 5/025 |
| 9,529,010 B2 * | 12/2016 | Johnson | ................. | G01P 1/10 |
| 9,552,737 B1 * | 1/2017 | Theriault | ............. | G01C 23/005 |
| 9,785,153 B2 * | 10/2017 | Gomez Ledesma | ... | G05D 1/101 |
| 2003/0132860 A1 * | 7/2003 | Feyereisen | ............. | G01C 23/00 340/973 |
| 2004/0243307 A1 | 12/2004 | Geelen | | |
| 2007/0213092 A1 | 9/2007 | TomTom | | |
| 2010/0082187 A1 * | 4/2010 | Nichols | .................. | G01C 23/00 701/16 |
| 2010/0091377 A1 * | 4/2010 | Hedges | .................... | A42B 3/04 359/630 |
| 2011/0121997 A1 * | 5/2011 | Paines | ....................... | B64F 1/20 340/945 |
| 2011/0215950 A1 * | 9/2011 | Wagner | ............... | G01C 21/3632 340/995.14 |
| 2014/0368359 A1 * | 12/2014 | Johnson | .................... | G01P 1/10 340/969 |
| 2016/0376027 A1 * | 12/2016 | Lepage | .................. | B64D 45/08 701/16 |
| 2016/0379502 A1 * | 12/2016 | Lepage | ................ | G01C 23/005 701/16 |

FOREIGN PATENT DOCUMENTS

RU 2297596 C1 4/2007
WO 20110073682 A1 6/2011

OTHER PUBLICATIONS

International Search Report and Written Opinion of Application No. PCT/GB2015/052452, dated Oct. 28, 2015, 8 pages.
Great Britain Search Report for Application No. GB14152821, dated Feb. 26, 2015, 3 pages.
International Search Report and Written Opinion of Application No. PCT/GB2015/052449, dated Oct. 28, 2015, 11 pages.
Great Britain Search Report for Application Nuber GB1415283.9, dated Jan. 26, 2015, 3 pages.
International Search Report and Written Opinion of Application No. PCT/GB2015/052451, dated Oct. 28, 2015, 12 pages.
International Preliminary Report on Patentability for Appl No. PCT/GB2015/052452 dated Feb. 28, 2017, 7 pages.
International Preliminary Report on Patentability for Appl No. PCT/GB2015/052449 dated Feb. 28, 2017, 9 pages.

* cited by examiner

METHOD AND APPARATUS FOR DISPLAY OF AN IMAGE TO A PILOT OF AN AIRCRAFT

RELATED APPLICATIONS

This application is a National Phase application filed under 35 USC § 371 of PCT Application No. PCT/GB2015/052451 with an International filing date of Aug. 25, 2015 which claims priority of GB Patent Application 1415283.9 filed Aug. 29, 2014. Each of these applications is herein incorporated by reference in their entirety for all purposes.

FIELD OF THE INVENTION

The present invention relates to the display of images to pilots of aircraft.

BACKGROUND

Helmet Mounted Displays (HMD), or head mounted displays, are display devices worn on the head of a user as part of a helmet. The HMD may be positioned in front of one or both of the user's eyes. Typically, the HMD is configured to reflect images projected on to it, while at the same time allowing the user to see through it.

It is known to use HMDs to display information to the pilot of an aircraft to facilitate the pilot in performing an operation such as landing the aircraft. Such information is often referred to as "HMD symbology".

HMD symbology for facilitating a pilot of an aircraft to land that aircraft on an aircraft carrier includes: Ship Referenced Velocity Vectors (SRVVs), Ship Referenced Velocity Vector scales (SRVV scales), Flight Path Markers (FPMs), and horizon bars.

Many factors may cause the HMD symbology displayed to a pilot to be erroneous or inaccurate. Such errors and inaccuracies may increase the likelihood of aircraft damage as well as pilot or ground crew injury. Thus, there is a need to determine when displayed HMD symbology is erroneous, and to mitigate the effects of the error.

SUMMARY OF THE INVENTION

In a first aspect, the present invention provides a method for displaying an image to a pilot of an aircraft. The method comprises: acquiring, by one or more processors operatively linked to a helmet mounted display, a first value, the first value being a measurement of the velocity of the aircraft relative to a runway upon which the aircraft is to be landed; displaying, by the helmet mounted display, to the pilot of the aircraft, a first image component (e.g. an SRVV scale), the position of the first image component on the helmet mounted display being dependent upon the first value; displaying, by the helmet mounted display, to the pilot, a second image component (e.g. an SRVV), the second image component being such that, if, from the pilot's point of view, the first image component and the second image component are in a pre-specified configuration (e.g. coincident) on the helmet mounted display, the aircraft is established on a predefined glide slope; displaying, by the helmet mounted display, to the pilot, a third image component (e.g. an FPM), the position of the third image component on the helmet mounted display being dependent upon the position on the helmet mounted display of the second image component; displaying, by the helmet mounted display, to the pilot, a fourth image component, the fourth image component indicating a first position on the helmet mounted display, the first position being such that if, from the pilot's point of view, the third image component is located at the first position, the first image component and the second image component would be in the pre-specified configuration on the helmet mounted display from the pilot's point of view; acquiring, by one or more processors, a second value, the second value being a value for the velocity of the aircraft relative to the runway, the second value being different to the first value; and displaying, by the helmet mounted display, to the pilot, a fifth image component, the fifth image component indicating a second position on the helmet mounted display, the second position being such that if, from the pilot's point of view, the third image component is located at the second position, the second image component would be located at a position on the helmet mounted display that it would have if the first image component was calculated using the second value of the velocity of the aircraft relative to the runway, and, from the pilot's point of view, the first image component and the second image component were in the pre-specified configuration on the helmet mounted display.

The first image component, the second image component, the third component, the fourth component, and the fifth component may be displayed by the helmet mounted display at the same time.

The method may further comprise controlling, by the pilot, the aircraft such that, from the pilot's point of view, the third image component is located at the second position thereby providing that, from the pilot's point of view, the second image component is located at the position on the helmet mounted display that it would have if the first image component was calculated using the second value and, from the pilot's point of view, the first image component and the second image component were in the pre-specified configuration on the helmet mounted display, and thereby the establishing the aircraft on a different glide slope.

The first image component may be a Ship Reference Velocity Vector scale for aiding the pilot to land the aircraft.

The first image components may be a linear object that extends horizontally across at least part of the helmet mounted display.

The second image component may be a Ship Reference Velocity Vector for aiding the pilot to land the aircraft.

The second value and the first value may differ by a predetermined interval value.

The step of displaying the first image component may comprise: providing a measurement, to the one or more processors, of a velocity of the aircraft relative to the Earth; providing a measurement, to the one or more processors, of a velocity of the runway relative to the Earth; and, using the provided measurements, determining, by the one or more processors, a specification for the first image component; and, using the determined specification, displaying, by the helmet mounted display, to the pilot, the first image component.

The step of displaying the fifth image component may comprise: providing, to the one or more processors, an indication that the first value is incorrect; establishing, by the one or more processors, a specification for the fifth image component; and, in response to the one or more processors receiving the indication, using the established specification, displaying, by the helmet mounted display, to the pilot, the fifth image component.

The step of establishing the specification for the fifth image component may comprise: modifying, by the one or more processors, the value of the velocity of the runway relative to the Earth; and, using the value of the velocity of the aircraft relative to the Earth and the modified value of the velocity of the runway relative to the Earth, establishing, by the one or more processors, the specification for the fifth image component.

The step of providing the indication that the first value is incorrect may comprise: controlling, by the pilot, the aircraft such that, from the pilot's point of view, the first image component and the second image component are in the pre-specified configuration on the helmet mounted display, thereby establishing the aircraft on the certain glide slope; determining, by the pilot, that, while the aircraft is established on the certain glide slope, from the pilot's point of view, the first image component moves with respect to one or more objects or features external to the aircraft; and subsequently providing, to the one or more processors, the indication that the first value is incorrect.

The pre-specified configuration may be that, from the pilot's point of view, the first image component and the second image component are coincident on the helmet mounted display.

In a further aspect, the present invention provides a method for displaying an image to a pilot of an aircraft. The method comprises, using a first value (e.g. a measurement) of the velocity of the aircraft relative to a runway, displaying, on an HMD worn by the pilot, an indication of a first position for an image component (e.g. an FPM), the first position being the position, from the pilot's point of view, that the image component would occupy if the aircraft was established on a predefined glideslope (for example, if an SRVV and an SRVV scale were, from the pilot's point of view, in a predefined configuration, e.g. overlapping, and the SRVV scale had been calculated using the first value); and, using a second value different to the first value, displaying, on the HMD, an indication of a second position for the image component, the second position being the position, from the pilot's point of view, that the image component would occupy if the aircraft was established on a different glideslope (for example, if the SRVV and the SRVV scale were, from the pilot's point of view, in a predefined configuration, e.g. overlapping, and the SRVV scale had been calculated using the second value instead of the first value).

In a further aspect, the present invention provides apparatus for displaying an image to a pilot of an aircraft, the apparatus comprising: one or more processor configured to determine respective specifications for a first image component, a second image component, a third component, a fourth component, and a fifth component; and a helmet mounted display operatively coupled to the one or more processors and configured to, display to the pilot of the aircraft, the first image component, the second image component, the third component, the fourth component, and the fifth component in accordance with the determined specifications. The position of the first image component on the helmet mounted display is dependent upon a first value for the velocity of the aircraft relative to a runway upon which the aircraft is to be landed. The second image component is such that, if, from the pilot's point of view, the first image component and the second image component are in a pre-specified configuration on the helmet mounted display, the aircraft is established on a certain glide slope. The third image component may be a flight path marker, the position of the third image component on the helmet mounted display being dependent upon the position on the helmet mounted display of the second image component. The fourth image component indicates a first position on the helmet mounted display, the first position being such that if, from the pilot's point of view, the third image component is located at the first position, the first image component and the second image component would be in the pre-specified configuration on the helmet mounted display from the pilot's point of view. The fifth image component indicates a second position on the helmet mounted display, the second position being such that if, from the pilot's point of view, the third image component is located at the second position, the second image component would be located at a position on the helmet mounted display that it would have if the first image component was calculated using a second value of the velocity of the aircraft relative to the runway, and, from the pilot's point of view, the first image component and the second image component were in the pre-specified configuration on the helmet mounted display. The second value of the velocity of the aircraft relative to the runway is different to the first value of the velocity of the aircraft relative to the runway.

In a further aspect, the present invention provides an aircraft comprising apparatus according to the preceding aspect.

In a further aspect, the present invention provides a program or plurality of programs arranged such that when executed by a computer system or one or more processors it/they cause the computer system or the one or more processors to operate in accordance with the method of any of the preceding aspects.

In a further aspect, the present invention provides a machine readable storage medium storing a program or at least one of the plurality of programs according to the preceding aspect.

DETAILED DESCRIPTION

Figure 1:
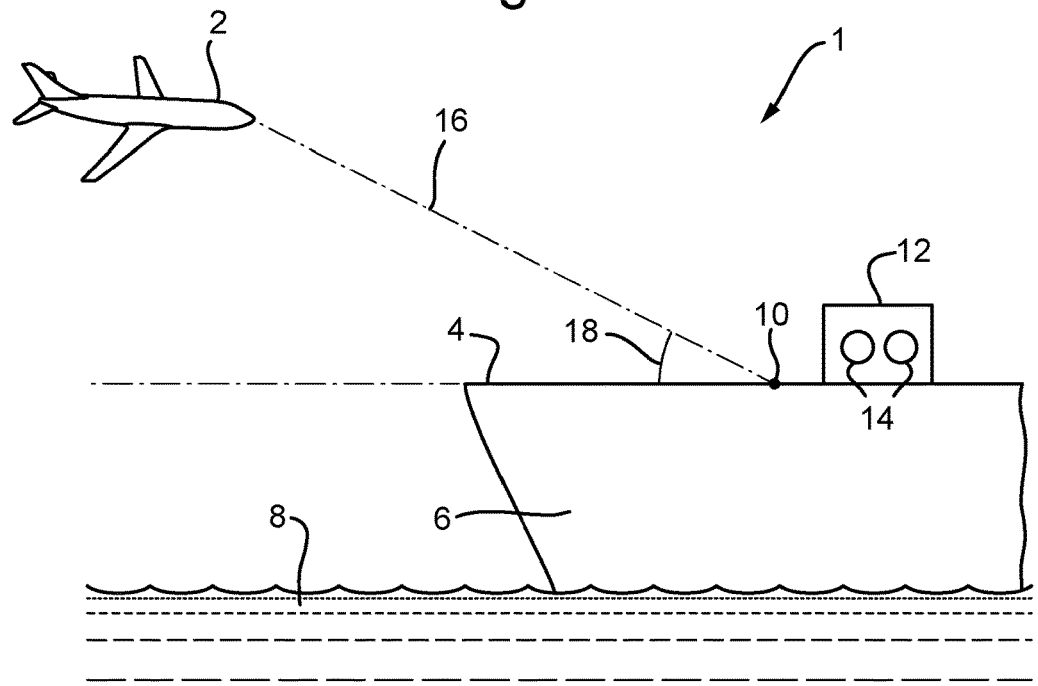
FIG. 1 is a schematic illustration (not to scale) showing a scenario in which an embodiment of an aircraft landing aid is implemented.

FIG. 1 is a schematic illustration (not to scale) showing a scenario 1 in which an embodiment of an aircraft landing aid is implemented.

In the scenario 1, an aircraft 2 is to land on a runway 4 of an aircraft carrier 6. The aircraft carrier 6 is afloat on a body of water 8, e.g. an ocean or sea. A desired or optimum landing position for the aircraft 2 on the runway 4 is hereinafter referred to as the "optimum landing position" and is indicated in FIG. 1 by the reference numeral 10.

A glide path indicator 12 is located onboard the aircraft carrier 6. The glide path indicator 12 is a visual landing aid comprising one or more light emitters 14 (e.g. "aim lights") which define glide path information for use by a pilot of the aircraft 2 through a helmet-mounted display. The glide path indicator 12 may, for example, be a "Bedford Array". The light emitters 14 may be, for example, pulsating visual approach slope indicators (PVASIs).

The light emitters 14 of the glide path indicator 12 indicate, to the pilot of the aircraft 2, a glide path 16. The glide path 16 is oblique, i.e. at an angle, to the runway 4. The angle between the glide path 16 and the runway 4 is indicated in FIG. 1 by the reference numeral 18.

The glide path 16 is such that, if the glide path 16 is followed by the aircraft 2, the aircraft 2 would land on the runway 4 at the optimum landing position 10.

The angle 18 between the glide path 16 and the runway 4 is such that, if the glide path 16 is followed by the aircraft 2, the aircraft 2 would have a descent profile corresponding to a desired, or optimum, landing. In this scenario 1, the angle 18 is 7°. However, in other embodiments, the angle 18 may be a different value e.g. 3°. Preferably, the angle is between 2° and 8°.

Figure 2:
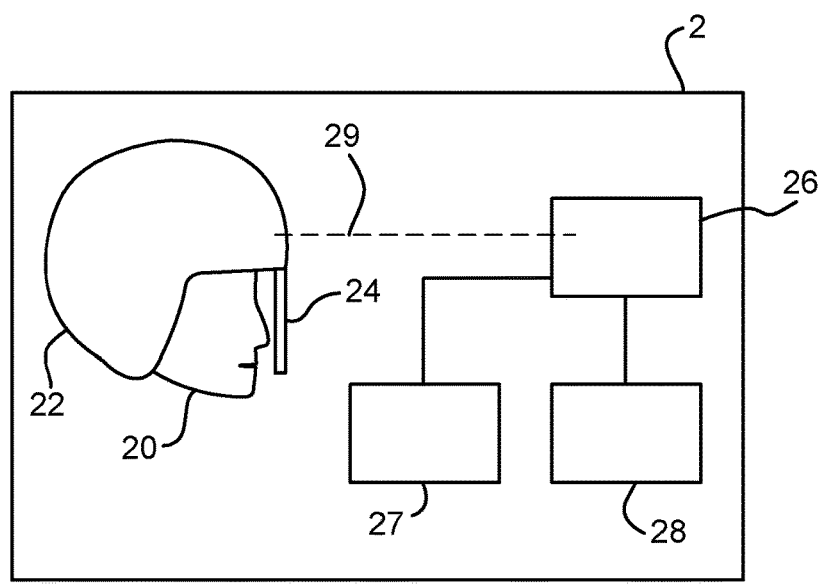
FIG. 2 is a schematic illustration (not to scale) showing an aircraft and illustrating a helmet mounted display (HMD) system.

FIG. 2 is a schematic illustration (not to scale) showing the aircraft 2.

A pilot 20 controls the aircraft 2. A method by which the pilot 20 controls the aircraft 2 to land on the runway 4 is described in more detail later below with reference to FIG. 3.

The aircraft 2 comprises an embodiment of an aircraft landing aid. The landing aid comprises a helmet 22 which is worn by the pilot 20 and includes a helmet mounted display 24. The landing aid further comprises a processor 26, a pilot interface 27, and a transceiver 28.

In this embodiment, the processor 26 is coupled to the pilot interface 27. As described in more detail later below with reference to FIG. 4, information may be input by the pilot 20 to the pilot interface 27, which may then be sent from the pilot interface 27 to the processor 26.

Also, the processor 26 is further coupled to the transceiver 28. As described in more detail later below with reference to FIG. 4, information received by the transceiver 28, for example from the aircraft carrier 6, may be sent from the transceiver 28 to the processor 26.

In this embodiment, the processor 26 is configured to process information received from the pilot interface 27 and/or the transceiver 28 so as to determine display information to be displayed to the pilot 20. This display information may facilitate the pilot 20 in landing the aircraft 2 on the runway 4 as described in more detail later below with reference to FIG. 3.

The processor 26 is coupled to the helmet 22 via a communications link 29 in such a way that display information determined by the processor 26 may be sent from the processor 26 to the helmet 22.

In some embodiments, the communications link 29 is a wired communications link. The helmet 22 may be plugged into the aircraft systems via a plug located at the pilot's seat.

The helmet 22 is configured to display the received display information to the pilot 20 on the helmet mounted display 24.

In this embodiment, the helmet mounted display 24 is an optical head-mounted display (OHMD) that has the capability of reflecting projected images as well as allowing the pilot 20 to see through it.

Figure 3:
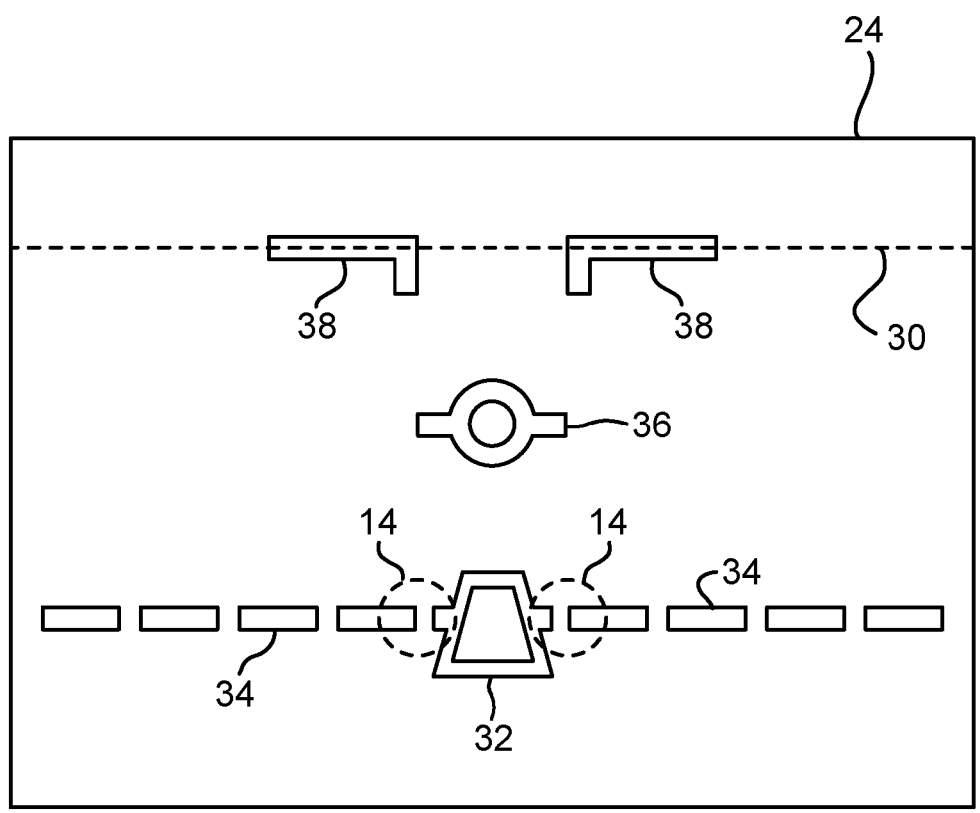
FIG. 3 is a schematic illustration (not to scale) showing helmet mounted display symbology as seen by a pilot during the landing of the aircraft.

FIG. 3 is a schematic illustration (not to scale) showing the helmet mounted display 24, and certain objects which are seen through the helmet mounted display 24, as seen by the pilot 20 during the landing of the aircraft 2 on the runway 4. The helmet mounted display 24 displays information that facilitates the pilot 20 to safely land the aircraft 2 on the runway 4.

Objects and features that the pilot 20 may see through the helmet mounted display 24 are depicted in FIG. 3 using dotted lines. In particular, in this embodiment, the pilot 20 can see the light emitters 14 of the glide path indicator 12 and the horizon 30 through the helmet mounted display 24. The pilot 20 may see other additional objects/features through the helmet mounted display 24, but these have been omitted from FIG. 3 for reasons of clarity and ease of depiction.

Objects and features that are projected onto the helmet mounted display 24 and may thusly be seen by the pilot 20 are depicted in FIG. 3 using solid lines. Objects and features that are projected onto the helmet mounted display 24 (i.e. image components) are also known as "Helmet Mounted Display (HMD) symbology". In this embodiment, the HMD symbology includes: a Ship Referenced Velocity Vector (SRVV) 32; a Ship Referenced Velocity Vector glide slope scale, hereinafter referred to as the "SRVV scale" and indicated by the reference numeral 34; a Flight Path Marker (FPM) 36, and a plurality of horizon bars 38.

In this embodiment, the SRVV 32 appears on the helmet mounted display 24 as a substantially trapezium-shaped icon or object having two opposite horizontal arms protruding from it. The SRVV 32 is positioned on the helmet mounted display 24 so as to indicate to the pilot 20 the instantaneous glideslope of the aircraft 2 relative to the runway 4 of the moving aircraft carrier 6. In this embodiment, this instantaneous glideslope of the aircraft 2 relative to the runway 4 is different from the glideslope relative to the Earth, due to the aircraft carrier's speed through the water 8.

In this embodiment, the SRVV scale 34 appears as a dashed line horizontally across the helmet mounted display 24. The SRVV scale 34 is positioned on the helmet mounted display 24 at a predefined depression angle (i.e. vertically displaced) below the horizon bars 38. This displacement (i.e. the predefined depression angle) is based upon the angle 18 between the desired glideslope 16 and the runway 4. For example, the predefined depression angle may be equal to angle 18.

In this embodiment, the FPM 36 appears as a circle having two opposite horizontal arms protruding from it. The FPM 36 indicates the aircraft's flight path relative to the Earth. In some embodiments, the position on the display 24 of the SRVV 32 and/or the SRVV scale 34 is dependent upon the position on the display 24 of the FPM 36. In some embodiments, the SRVV 32 is offset from the FPM 36 by an amount proportional to the ship's speed. In some embodiments, if the ship 6 is stationary, the SRVV 32 and the FPM 36 are coincident on the display 24.

In this embodiment, horizon bars 38 appear as substantially L-shaped objects having longer horizontal arms and shorter vertical arms. The horizon bars 38 are the reference position of a Climb/Dive ladder of the aircraft 2. Preferably, the horizon bars 38 remain coincident with the real-world horizon, and may be used as a reference for determining the aircraft flight path via the FPM 36 or SRVV 32.

In an example operation, in order to perform an "optimum" landing of the aircraft 2 on the runway 4, firstly the pilot 20 controls the aircraft 2 to fly in a substantially straight and level state until he/she sees the SRVV scale 34 displayed by the helmet mounted display 24 coincide with (i.e. pass through) the two light emitters 14 seen through the helmet mounted display 24. The SRVV scale 34 coinciding with the light emitters 14 is shown in FIG. 3.

Once the SRVV scale 34 is coincident with the light emitters 14, the pilot 20 begins the descent of the aircraft 2 towards the runway 4 (i.e., the pilot 20 "tips over" the aircraft 2).

During the aircraft's descent, the pilot 20 controls the aircraft 2 (i.e. controls the angle of descent of the aircraft 2) such that the SRVV 32 is coincident with the SRVV scale 34. In this example operation, the SRVV 32 is deemed to be coincident with the SRVV scale 34 if the horizontal arms of the SRVV 32 are aligned along the SRVV scale 34, for example, as shown in FIG. 3. In this example, the SRVV 32 is also positioned between the light emitters 14 seen through the helmet mounted display 24.

In this example, the SRVV 32 and the SRVV scale 34 are such that, when the SRVV 32, the SRVV scale 34, and the light emitters 14 are coincident, as shown in FIG. 3 and described above, the aircraft 2 is established on the desired 7° glide path towards the runway 4.

Thus, once the SRVV 32 is coincident with the SRVV scale 34, the pilot 20 controls the aircraft 2 to keep the SRVV 32 coincident with the SRVV scale 34, thereby maintaining the aircraft 2 on the desired 7° glide path towards the runway 4.

The aircraft 2 is controlled in this way until it has landed on the runway 4. FIG. 3 shows an example "sight picture" that the pilot 20 should be attempting to achieve during the landing operation.

During this example operation, the horizon bars 38 overlap with the horizon seen through the helmet mounted display 24.

In some landing operations, the SRVV 32 renders the FPM 36 redundant. The FPM 36 may be removed from the symbology displayed to the pilot 20. However, in some embodiments, the FPM 36 is displayed during the landing operation and provides, to the pilot 20, confidence that the SRVV 32 is being displayed in the correct position on the helmet mounted display 24.

Figure 4:
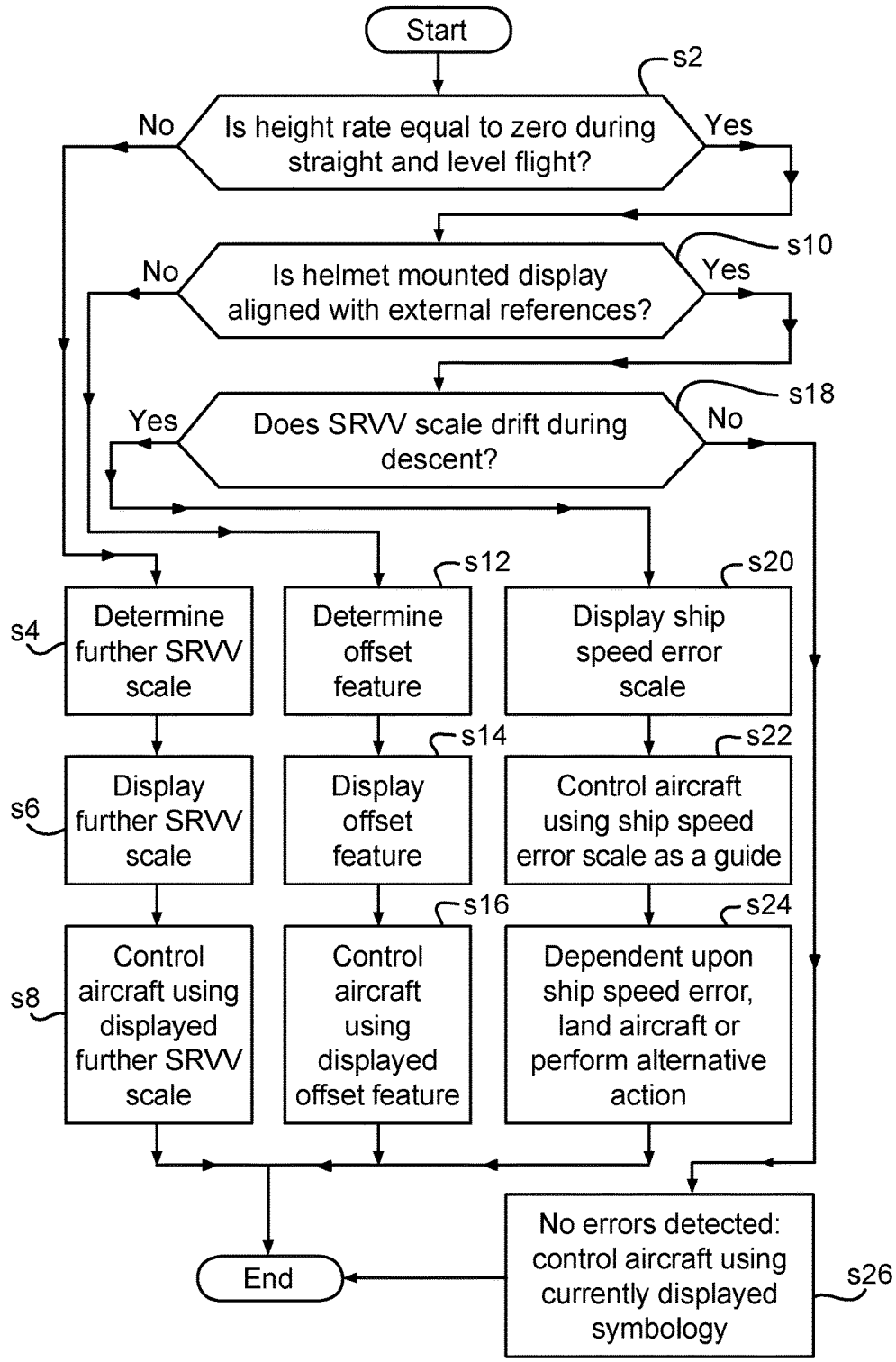
FIG. 4 is a process flow chart showing certain steps of a process by which certain factors that are adversely affecting the displayed HMD symbology may be determined and mitigated.

Many factors may adversely affect the accuracy of the displayed HMD symbology. FIG. 4 is a process flow chart showing certain steps of a process by which certain factors that are adversely affecting the displayed HMD symbology may be determined and mitigated.

It should be noted that certain of the process steps depicted in the flowchart of FIG. 4 and described below may be omitted or such process steps may be performed in differing order to that presented above and shown in FIG. 4. Furthermore, although all the process steps have, for convenience and ease of understanding, been depicted as discrete temporally-sequential steps, nevertheless some of the process steps may in fact be performed simultaneously or at least overlapping to some extent temporally.

At step s2, whilst the aircraft 2 is operating in a substantially straight and level state, the pilot 20 determines whether or not the height rate of the aircraft 2 is equal to zero. Operating the aircraft in a straight and level state may include the pilot 20 controlling the aircraft 2 such that the FPM 36 is positioned onto the horizon 30.

The height rate of the aircraft 2 may, for example, be determined by the processor 26 or a different processing device onboard the aircraft 2 using one or more measurements taken by a sensor system on board the aircraft 2.

The height rate of the aircraft 2 may, for example, be displayed to the pilot 2 on the helmet mounted display 2, or on a control panel in the cockpit of the aircraft 2.

If, whilst flying straight and level, the height rate of the aircraft 2 is not equal to zero, in this embodiment it is determined that an error has occurred with the Internal Navigation System (INS) of the aircraft 2, for example, one or more of the sensors used by the aircraft's navigation system may have malfunctioned. The method then proceeds to step s4.

However, if, whilst flying straight and level, the height rate of the aircraft 2 is equal to zero, in this embodiment it is determined that no INS error has occurred and the method proceeds to step s10. Step s10 will be described in more detail later below after a description of steps s4 to s8.

At step s4, the processor 26 determines a further SRVV scale. This may be performed by the processor 26 in response to the processor 26 receiving an indication from the pilot 20, via the interface 27, that, whilst flying straight and level, the height rate of the aircraft 2 is not equal to zero.

The determination of the further SRVV scale may, for example, be performed as follows.

Firstly, the processor 26 may determine a "correct" height rate for the aircraft 2. The correct height rate for the aircraft 2 may be expressed as:

$$\dot{h}_{correct} = (v_{aircraft} - v_{ship}) \tan \gamma_{SRVV}$$

where:
$v_{aircraft}$ is the velocity of the aircraft 2, which may be provided to the processor 26 from one or more aircraft sub systems;
$v_{ship}$ is the velocity of the aircraft carrier 6, which may be provided to the processor 26 by the aircraft carrier 6 via the transceiver 28, or by the pilot 20 inputting the aircraft carrier's speed using the interface 27 based on communications from the aircraft carrier 6; and
$\gamma_{SRVV}$ is the desired glide path angle 18 (i.e. 7° in this embodiment).

The processor 26 may then determine the height rate error, which may be expressed as:

$$\dot{h}_{error} = \dot{h}_{ins} - \dot{h}_{correct}$$

where $\dot{h}_{ins}$ is the height rate of the aircraft 2 as output by the INS of the aircraft 2.

The processor 26 may then determine a new glide path angle, for example, using the following equation:

$$\gamma_{SRVVerror} = \arctan\left(\frac{\dot{h}_{error}}{(v_{aircraft} - v_{ship})}\right)$$

where $\gamma_{SRVVerror}$ is an error value that may be added/subtracted from the 7° glide slope, i.e., from $\gamma_{SRVV}$ so as to provide the new glide path angle.

For example, $\gamma_{newSRVV} = \gamma_{SRVV} +/- \gamma_{SRVVerror}$.

The new glide path angle $\gamma_{newSRVV}$ is then used by the processor 26 to determine the further SRVV scale. In this embodiment, the further SRVV scale is equal to the current SRVV scale 34 shifted or displaced on the helmet mounted display 24 by a vertical distance proportional to $\dot{h}_{error}$.

At step s6, the processor 26 displays the determined further SRVV scale on the helmet mounted display 24.

Figure 5:
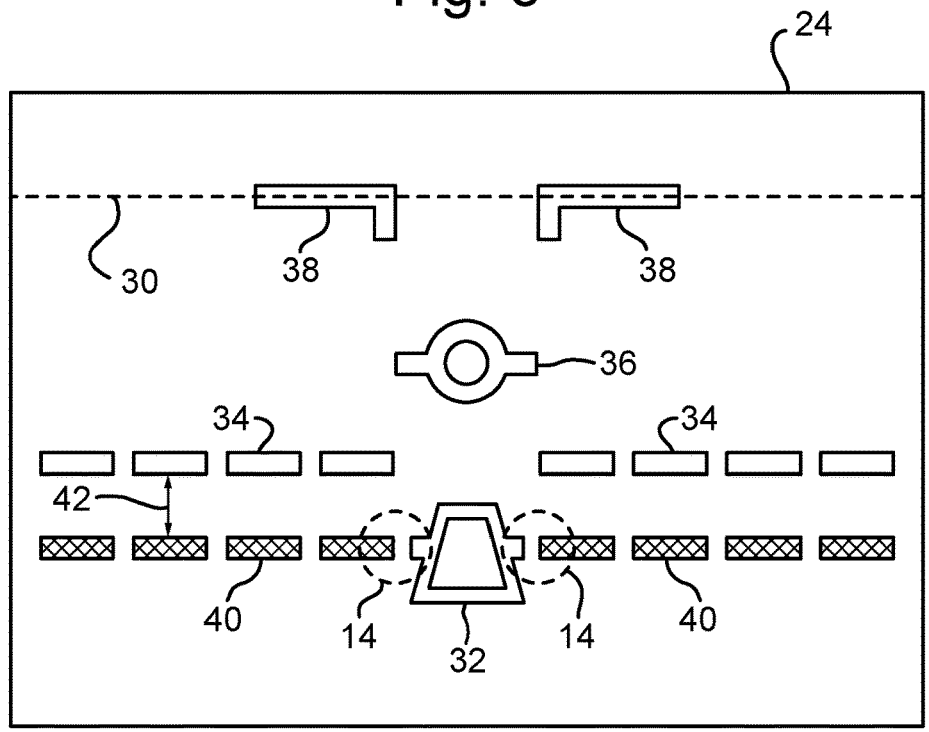
FIG. 5 is a schematic illustration (not to scale) showing a further SRVV scale displayed on the helmet mounted display.

FIG. 5 is a schematic illustration (not to scale) showing the further SRVV scale 40 displayed on the helmet mounted display 24. FIG. 5 shows the helmet mounted display 24, and certain objects/features which are seen through the helmet mounted display 24, as seen by the pilot 20 during the landing of the aircraft 2. The further SRVV scale 40 is an additional image component (i.e. additional HMD symbology) that is displayed to the pilot 20 on the helmet mounted display 24.

In this embodiment, the further SRVV scale 40 appears as a dashed line horizontally across the helmet mounted display 24 (i.e. the further SRVV scale 40 is parallel with the SRVV scale 34). The further SRVV scale 40 is shown in FIG. 5 as a solid, filled-in, dashed line to help the reader distinguish it from the SRVV scale 34.

The distance between the SRVV scale 34 and the further SRVV scale 40 is indicated in FIG. 5 by a double headed arrow and the reference numeral 42. In this embodiment, this distance 42 is proportional to $\dot{h}_{error}$.

FIG. 5 shows both the SRVV scale 34 and the further SRVV scale 40 for ease of understanding, however in some embodiments, the further SRVV scale 40 replaces the previous SRVV scale 34, and the SRVV scale 34 is not displayed to the pilot 20. This tends to minimise the likelihood of the pilot 20 being confused by multiple SRVV scales being displayed.

At step s8, the pilot 20 controls the aircraft 2 using the further SRVV scale 40. In particular, in order to perform a landing operation, the pilot 20 controls the aircraft 2 to fly in a substantially straight and level state until he/she sees the further SRVV scale 40 coincide with the two light emitters 14 seen through the helmet mounted display 24. The further SRVV scale 40 coinciding with the light emitters 14 is shown in FIG. 5. The pilot 20 then controls the aircraft 2 to descend towards the runway 4, as described in more detail earlier above with reference to FIG. 3. The aircraft 2 is then controlled as normal by the pilot 20 and the aircraft 2 is landed on the runway 4.

After step s8, the process of FIG. 4 ends.

Returning now to the case where, at step s2, it is determined that, whilst flying straight and level, the height rate of the aircraft 2 is equal to zero, at step s10, the pilot 20 determines whether or not the HMD symbology displayed on the helmet mounted display 24 aligns with one or more reference features or objects external to the aircraft 2.

For example, the pilot 20 may determine whether or not, while controlling the aircraft 2 to fly in a straight and level state, the horizon bars 38 coincide with the horizon 30.

If it is determined that, whilst flying straight and level, the HMD symbology does not align with reference features or objects external to the aircraft 2, in this embodiment it is determined that a "helmet mounted display (HMD) offset" type error has occurred. The method then proceeds to step s12. HMD offset errors may occur, for example, as a result of sensor error, or as a result of the helmet 22 not being correctly fitted to, or moving with respect to, the pilot's head 20.

However, if it is determined that, whilst flying straight and level, the HMD symbology correctly aligns with reference features or objects external to the aircraft 2, in this embodiment it is determined that no HMD offset error has occurred and the method proceeds to step s18. Step s18 will be described in more detail later below after a description of steps s12 to s16.

At step s12, the processor 26 determines a specification of an "offset feature" to be displayed to the pilot 20. This may be performed by the processor 26 in response to the processor 26 receiving an indication from the pilot 20, via the interface 27, that, whilst flying straight and level, the HMD symbology does not align with reference features or objects external to the aircraft 2.

The offset feature and its determination will be explained in more detail later below with reference to FIG. 6.

At step s14, the processor 26 displays the determined offset feature on the helmet mounted display 24.

Figure 6:
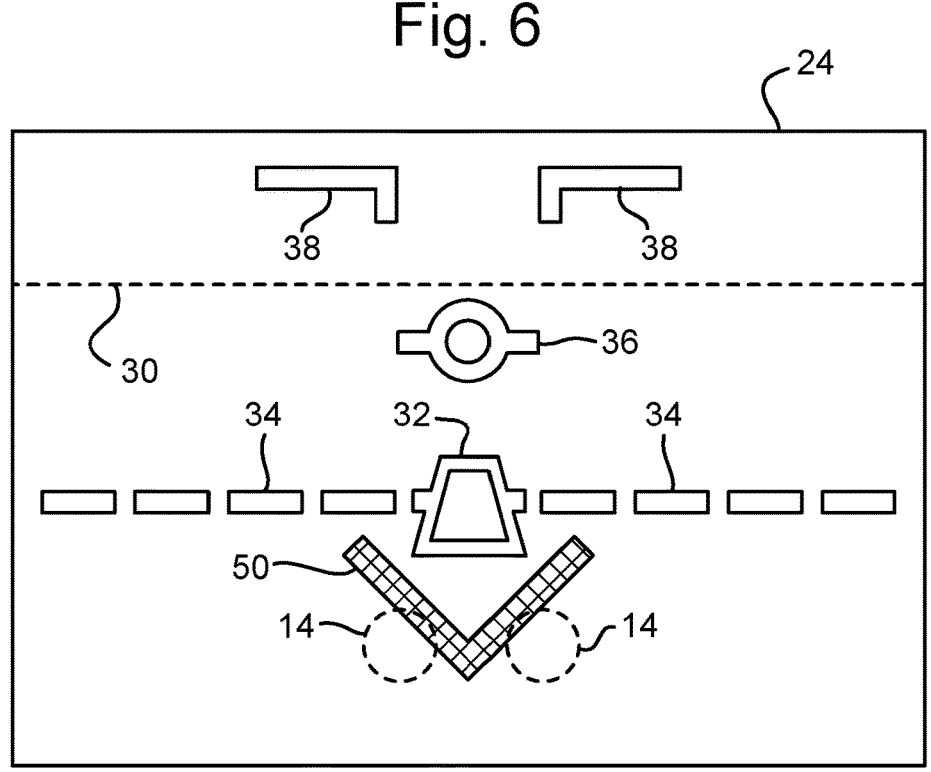
FIG. 6 is a schematic illustration (not to scale) showing an offset feature displayed on the helmet mounted display.

FIG. 6 is a schematic illustration (not to scale) showing the offset feature 50 displayed on the helmet mounted display 24. FIG. 6 shows the helmet mounted display 24, and certain objects/features which are seen through the helmet mounted display 24, as seen by the pilot 20 during the landing of the aircraft 2. The offset feature 50 is an additional image component (i.e. additional HMD symbology) that is displayed to the pilot 20 on the helmet mounted display 24.

In this embodiment, an HMD offset type error means that, from the pilot's point of view, all HMD symbology displayed on the helmet mounted display 24 is shifted either up or down (i.e. vertically) with respect to the objects/features viewed through the helmet mounted display 24 (e.g. the light emitters 14). The offset feature 50 indicates to the pilot 20 a range of possible actual positions that the SRVV scale 34 may have with respect to the objects/features viewed through the helmet mounted display 24. Thus, the offset feature 50 is, in effect, an "error bar" for the SRVV scale 34.

In this embodiment, the offset feature 50 appears as a V-shaped object or icon. The offset feature 50 is shown in FIG. 5 as solid, filled-in V-shaped object.

The offset feature 50 indicates possible actual positions of the SRVV scale 34 with respect to the objects/features external to the aircraft 2. In particular, in this embodiment the actual position of the SRVV scale 34 with respect to an object external to the aircraft 2 may be any horizontal line that passes through the offset feature 50. Thus, the larger the size of the offset feature 50 (i.e. the larger the distance between the SRVV scale 34 and the tip of the V-shaped offset feature 50), the larger the range of possible true positions of the SRVV scale 34 relative to the objects/features external to the aircraft 2.

The size of the offset feature 50 that is displayed to the pilot 20 may be determined by the processor 26 using any appropriate parameter values. For example, using properties of the helmet 22 and/or the pilot 20 (e.g. the size and shape of the pilot's head), the processor 26 may determine (e.g. by looking up in a database) a value for a maximum or most likely HMD offset by which the HMD symbology may be shifted with respect to objects/features external to the aircraft 2. The processor 26 may then specify an appropriately sized offset feature 50. Typically, the offset feature 50 is indicative of an HMD offset of between 0.5° and 3°, and more typically of about 1°.

In this embodiment, the width of the V-shaped offset feature 50 along a particular horizontal line that passes through the offset feature 50 (i.e. the distance between the two arms of the V-shaped offset feature 50 along that horizontal line) is indicative of the probability that that horizontal line is the actual position of the SRVV scale 34 with respect to the objects/features external to the aircraft 2. Thus, the larger the angle between the arms of the V-shaped offset feature 50, the more likely it is that the actual position of the SRVV scale 34 is at or close to the currently displayed SRVV scale 34.

The size of the angle between the arms of the V-shaped offset feature 50 may be determined by the processor 26 using any appropriate parameter values. For example, using properties of the helmet 22 and/or the pilot 20 (e.g. the size and shape of the pilot's head), the processor 26 may determine the probability of an HMD offset error occurring. The processor 26 may then specify an appropriately shaped offset feature 50.

In this embodiment, the offset feature 50 is associated with the SRVV scale 34 and has a fixed position on the helmet mounted display 24 with respect to the SRVV scale 34. Thus, if the SRVV scale 34 moves on the helmet mounted display 34, the offset feature 50 moves correspondingly.

At step s16, the pilot 20 controls the aircraft 2 dependent upon the offset feature 50. In particular, in order to perform a landing operation, the pilot 20 controls the aircraft 2 to fly in a substantially straight and level state until he/she sees the two light emitters 14 (seen through the helmet mounted display 24) coincide with a horizontal line that passes through the offset feature 50 and/or the SRVV scale 34. The light emitters 14 coinciding with a horizontal line that passes through the offset feature 50 is shown in FIG. 5. The pilot 20 then controls the aircraft 2 to descend towards the runway 4, as described in more detail earlier above. The aircraft 2 is then controlled as normal by the pilot 20 and the aircraft 2 is landed on the runway 4. The pilot 20 uses his/her experience, as well as the size and shape of the offset feature 50, to determine an appropriate "tipping point" at which to begin the aircraft's descent.

After step s16, the process of FIG. 4 ends.

Returning now to the case where, at step s10, it is determined that, whilst flying straight and level, the HMD symbology correctly aligns with reference features or objects external to the aircraft 2, at step s18, the pilot 20 begins his/her descent as normal (i.e. when the SRVV scale 34 aligns with the light emitters 14) and, during the descent and when the aircraft 2 is established on the glide path 16, determines whether or not the SRVV scale 34 drifts (i.e. moves vertically) with respect to the light emitters 14.

If it is determined that, during the aircraft's descent, the SRVV scale 34 drifts with respect to the light emitters 14, in this embodiment it is determined that there is an error in the speed of the aircraft carrier 6 used by the processor 26 to calculate the SRVV scale 34. Such an error may result from errors in the measurement of the aircraft carrier's speed and/or an error in the speed communicated to the aircraft 2 from the aircraft carrier 6. The method then proceeds to step s20.

However, if it is determined that, during the aircraft's descent, the SRVV scale 34 does not drift with respect to the light emitters 14, in this embodiment it is determined that there is no error in the speed value used by the processor 26 to determine the SRVV scale 34 and the method proceeds to step s26. Step s26 will be described in more detail later below after a description of steps s20 to s24.

At step s20, a "ship speed error scale" is displayed to the pilot 20. This may be performed by the processor 26 in response to the processor 26 receiving an indication from the pilot 20, via the interface 27, that, during the aircraft's descent, the SRVV scale 34 drifts with respect to the light emitters 14.

In this embodiment, the ship speed error scale is displayed to the pilot only if, during the aircraft's descent, the SRVV scale 34 drifts with respect to the light emitters 14. However, in other embodiments, the ship speed error scale is displayed to the pilot 20 only if one or more different criteria are satisfied instead of or in addition to SRVV scale 34 drift. In some embodiment, the ship speed error scale is displayed to the pilot during the descent of the aircraft 2 irrespective of whether or not the SRVV scale 34 drifts with respect to the light emitters 14.

Figure 7:
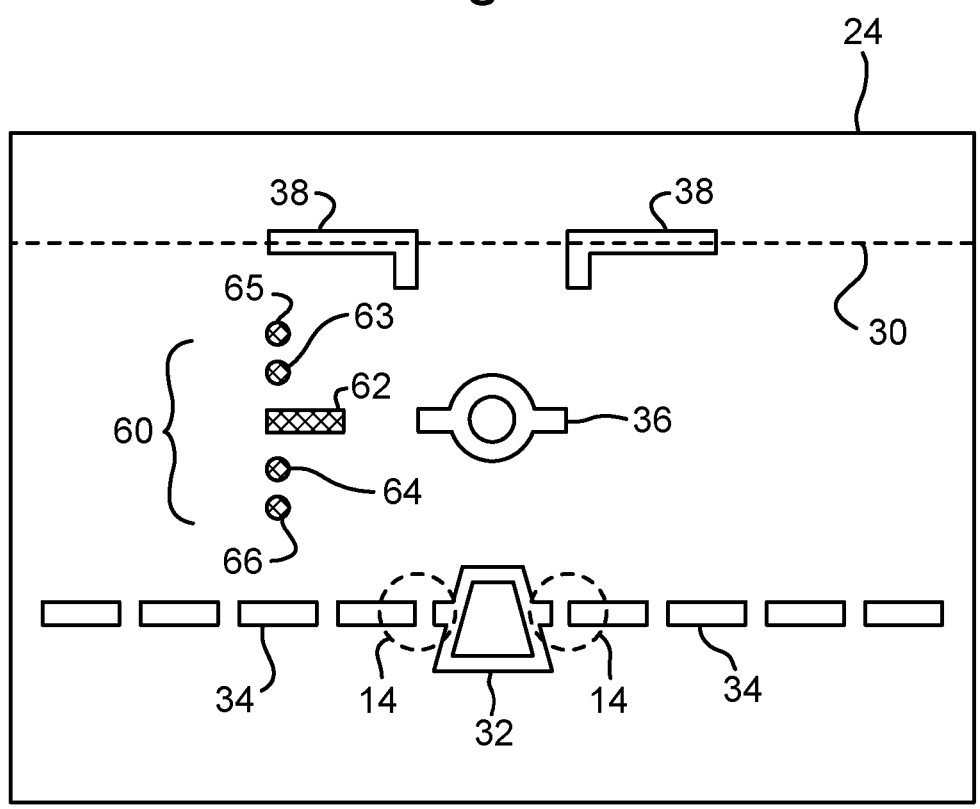
FIG. 7 is a schematic illustration (not to scale) showing a ship speed error scale displayed on the helmet mounted display.

FIG. 7 is a schematic illustration (not to scale) showing the ship speed error scale 60 displayed on the helmet mounted display 24. FIG. 7 shows the helmet mounted display 24, and certain objects/features which are seen through the helmet mounted display 24, as seen by the pilot 20 during the landing of the aircraft 2. The ship speed error scale 60 is an additional image component (i.e. additional HMD symbology) that is displayed to the pilot 20 on the helmet mounted display 24.

In this embodiment, the ship speed error scale 60 comprises a horizontal dash 62, a first dot 63, a second dot 64, a third dot 65, and a fourth dot 66. The ship speed error scale 60 is shown in FIG. 7 as solid, filled-in symbology.

In this embodiment, the position of the ship speed error scale 60 on the helmet mounted display 24 is fixed relative to the horizon bars 38. In other embodiments, the position of the ship speed error scale 60 on the helmet mounted display 24 may be fixed relative to different HMD symbology instead of or in addition to the horizon bars 38.

In this embodiment, the dash 62 is a horizontal line that is aligned with the position on the helmet mounted display 24 that, during the "optimum" landing of the aircraft 2 on the runway 4, the FPM 36 would have if the speed of the aircraft carrier (i.e. ship speed), provided by the aircraft carrier 6 to the processor 26 and used by the processor 26 to determine the SRVV scale 34, was correct.

The position of the dash 62 on the helmet mounted display 24 relative to the SRVV scale 34 may be determined using the following formula:

$$\gamma_{dash} = \arctan\left(\frac{(v_{aircraft} - v_{ship})\tan\gamma_{SRVV}}{v_{aircraft}}\right)$$

where:

$\gamma_{dash}$ defines the position of the FPM 36 during the aircraft's descent to the aircraft carrier 6 when the SRVV 32 is aligned with the SRVV scale 34. $\gamma_{dash}$ tends to be positioned on the display 24 above the SRVV 32, and offset from the SRVV 32 by an amount proportional to the speed of the aircraft carrier 6;

$v_{aircraft}$ is the velocity of the aircraft 2, which may be provided to the processor 26 from one or more aircraft sub systems;

$v_{ship}$ is the velocity of the aircraft carrier 6 provided to the processor 26 by the aircraft carrier 6 via the transceiver 28; and $\gamma_{SRVV}$ is the desired glide path angle 18 (i.e. 7° in this embodiment).

In this embodiment, the first dot 63 is horizontally aligned with the position on the helmet mounted display that, during an "optimum" landing of the aircraft 2 on the runway 4, the FPM 36 would have if the ship speed provided to the processor 26 and used by the processor 26 to determine the SRVV 32 was a first predetermined amount (e.g. 5 knots) more than the actual speed of the aircraft carrier 6, and if the SRVV 32 was aligned with the SRVV scale 34.

The position of the first dot 63 on the helmet mounted display 24 relative to the SRVV scale 34 may be determined using the following formula:

$$\gamma_{dot1} = \arctan\left(\frac{(v_{aircraft} - (v_{ship} + v_1))\tan\gamma_{SRVV}}{v_{aircraft}}\right)$$

where:

$\gamma_{dot1}$ defines the position on the display 24 that the FPM 36 would have during the aircraft's descent to the aircraft carrier 6, if the SRVV 32 was aligned with the SRVV scale 34, and if the ship speed is was $v_1$ more than that assumed; and $v_1$ is the first predetermined amount.

In other words, the first dot 63 indicates a position on the helmet mounted display 24 that the FPM 36 would have if the SRVV 32 was calculated using $v_{ship}+v_1$ as the velocity of the aircraft carrier 6, and, from the pilot's point of view, the SRVV scale 34 and the SRVV 32 were coincident.

In this embodiment, the second dot 64 is horizontally aligned with the position on the helmet mounted display 24 that, during an "optimum" landing of the aircraft 2 on the runway 4, the FPM 36 would have if the ship speed provided to the processor 26 and used by the processor 26 to determine the SRVV 32 was the first predetermined amount (e.g. 5 knots) less than the actual speed of the aircraft carrier 6, and if the SRVV 32 was aligned with the SRVV scale 34.

The position of the second dot 64 on the helmet mounted display 24 relative to the SRVV scale 34 may be determined using the following formula:

$$\gamma_{dot2} = \arctan\left(\frac{(v_{aircraft} - (v_{ship} - v_1))\tan\gamma_{SRVV}}{v_{aircraft}}\right)$$

where:

$\gamma_{dot2}$ is defines the position on the display 24 that the FPM 36 would have during the aircraft's descent to the aircraft carrier 6, if the SRVV 32 was aligned with the SRVV scale 34, and if the ship speed is was $v_1$ less than that assumed. In other words, the second dot 64 indicates a position on the helmet mounted display 24 that the FPM 36 would have if the SRVV 32 was calculated using $v_{ship}-v_1$ as the velocity of the aircraft carrier 6, and, from the pilot's point of view, the SRVV scale 34 and the SRVV 32 were coincident.

In this embodiment, the third dot 65 is horizontally aligned with the position on the helmet mounted display 24 that, during an "optimum" landing of the aircraft 2 on the runway 4, the FPM 36 would have if the ship speed provided to the processor 26 and used by the processor 26 to determine the SRVV 32 was a second predetermined amount (e.g. 10 knots) more than the actual speed of the aircraft carrier 6, and if the SRVV 32 was aligned with the SRVV scale 34.

The position of the third dot 65 on the helmet mounted display 24 relative to the SRVV scale 34 may be determined using the following formula:

$$\gamma_{dot3} = \arctan\left(\frac{(v_{aircraft} - (v_{ship} + v_2))\tan\gamma_{SRVV}}{v_{aircraft}}\right)$$

where:

$\gamma_{dot3}$ is defines the position on the display 24 that the FPM 36 would have during the aircraft's descent to the aircraft carrier 6, if the SRVV 32 was aligned with the SRVV scale 34, and if the ship speed is was $v_2$ more than that assumed; and $v_2$ is the second predetermined amount.

In other words, the third dot 65 indicates a position on the helmet mounted display 24 that the FPM 36 would have if the SRVV scale 34 was calculated using $v_{ship}+v_2$ as the velocity of the aircraft carrier 6, and, from the pilot's point of view, the SRVV scale 34 and the SRVV 32 were coincident.

In this embodiment, the fourth dot 66 is horizontally aligned with the position on the helmet mounted display 24 that, during an "optimum" landing of the aircraft 2 on the runway 4, the FPM 36 would have if the ship speed provided to the processor 26 and used by the processor 26 to determine the SRVV 32 was the second predetermined amount (e.g. 10 knots) less than the actual speed of the aircraft carrier 6, and if the SRVV 32 was aligned with the SRVV scale 34.

The position of the fourth dot 66 on the helmet mounted display 24 relative to the SRVV scale 34 may be determined using the following formula:

$$\gamma_{dot4} = \arctan\left(\frac{(v_{aircraft} - (v_{ship} - v_2))\tan\gamma_{SRVV}}{v_{aircraft}}\right)$$

where:

$\gamma_{dot4}$ is defines the position on the display 24 that the FPM 36 would have during the aircraft's descent to the aircraft carrier 6, if the SRVV 32 was aligned with the SRVV scale 34, and if the ship speed is was $v_2$ less than that assumed.

In other words, the fourth dot 66 indicates a position on the helmet mounted display 24 that the FPM 36 would have if the SRVV 32 was calculated using $v_{ship}-v_2$ as the velocity of the aircraft carrier 6, and, from the pilot's point of view, the SRVV scale 34 and the SRVV 32 were coincident.

At step s22, the pilot 20 controls the aircraft 2 dependent upon the displayed speed error scale 60. In particular, during the aircraft descent, the pilot 20 notices that the SRVV scale 34 is drifting with respect to the light emitters 14, and controls the aircraft 2 to adopt a shallower or steeper descent slope, and thereby causing the SRVV 32 to be vertically offset (i.e. misaligned) from the SRVV scale 34.

This offsetting of the SRVV 32 from the SRVV scale 34 may be performed by the pilot 20 aligning the FPM 36 with one of the dots of the ship speed error scale 60 (i.e. either the first dot 63, the second dot 64, the third dot 65, or the fourth dot 66). The pilot 20 may decide which dot 63-66 of the ship speed error scale 60 to align the FPM 36 with using his/her experience. The pilot 20 may decide which dot 63-66 of the ship speed error scale 60 to align the FPM 36 with based on his/her assessment of how quickly the SRVV scale 34 is drifting with respect to the light emitters 14. For example, based on the drifting of the SRVV scale 34, the pilot 20 may suspect that the ship speed provided by the aircraft carrier 6 is the first predetermined amount (e.g. 5 knots) less than the actual speed of the aircraft carrier 6. The pilot 20 may then control the aircraft 2 such that the FPM 36 is aligned with the first dot 63. This alignment of the FPM 36 with the first dot 63 causes the SRVV 32 to be shifted vertically with respect the SRVV scale 34. The SRVV scale 34 would then tend to cease drifting with respect the light emitters 14 if the ship speed provided by the aircraft carrier 6 was indeed the first predetermined amount less than the actual speed of the aircraft carrier 6.

Preferably, the pilot 20 iteratively adjusts the position of the FPM 36 with respect to the ship speed error scale 60 until the drifting of the SRVV scale 34 with respect to the light emitter ceases.

At step s24, if the error in the ship speed provided by the aircraft carrier 6 is above a threshold value, the pilot 20 may perform a certain action. For example if, in order to stop the SRVV scale 34 drifting with respect to the light emitters 14, the FPM 36 has to be shifted away from the dash 62 beyond the third or fourth dots 65, 66 (and thus, the error in the ship speed provided by the aircraft carrier 6 is above the second predetermined value, e.g. greater than 10 knots), the pilot 20 may abort the landing.

Otherwise, if the error in the ship speed provided by the aircraft carrier 6 is within an allowable range (e.g. ±10 knots), the pilot 20 may maintain the position of the FPM 36 and SRVV 32 on the helmet mounted display 24 and land the aircraft 2 on the runway 4.

After step s24, the process of FIG. 4 ends.

Returning to the case where, at step s18, it is determined that, during the aircraft's descent, the SRVV scale 34 does not drift with respect to the light emitters 14, at step s26 it is determined that there are no errors with the currently displayed HMD symbology, and the aircraft 2 is controlled to land on the runway by the pilot 20 as described earlier above with reference to FIG. 3.

After step s26, the process of FIG. 4 ends.

Thus, a process in which factors that adversely affect the displayed HMD symbology are determined and mitigated is provided. The above described method is an error diagnosis and mitigation process.

The above described apparatus and method advantageously tends to be capable of determining that errors have occurred in the display of HMD symbology. Furthermore, the above described apparatus and method advantageously tend to mitigate or correct for those errors.

The above described apparatus and method advantageously facilitate the pilot in the landing of the aircraft. Thus, safety tends to be improved. Also, the risk of damage to the aircraft or aircraft loss during landing due to HMD symbology errors, and/or other errors or faults, tends to be reduced or eliminated.

The above described further SRVV scale advantageously tends to aid the pilot in safely landing the aircraft when an error with the INS of the aircraft has occurred. SRVV scales tend to be physiologically compelling for pilots, and, during landing, pilots tend to be tempted to align the SRVV scale with aim lights even if they are aware that an HMD symbology error (e.g. an INS error) has occurred. Thus, by providing the pilot with a correctly drawn SRVV scale, problems caused by pilots being tempted to align erroneous SRVV scales with the aim lights tend to be overcome.

The above described offset feature advantageously tends to aid the pilot in safely landing the aircraft when an HMD offset error has occurred. The above described offset feature advantageously indicates to the pilot a range of possible true positions for the SRVV scale, as well as the relative likelihoods of those positions.

The above described ship speed error scale advantageously tends to aid the pilot in safely landing the aircraft when an erroneous aircraft carrier speed has been used to generate the SRVV. During the aircraft's descent towards the runway, initially the pilot would position the SRVV onto the SRVV scale. If the ship speed used by the processor to generate the SRVV scale was accurate, the FPM would be aligned with the dash of the ship speed error scale, the SRVV scale would not vertically drift with respect to the aim lights, and the aircraft would be correctly established on the desired glide path. However, if the SRVV scale does vertically drift with respect to the aim lights during the descent, the pilot may offset the SRVV with respect to the SRVV scale by an amount above or below the SRVV scale, using the ship speed error scale to judge how far to offset the FPM for a given error. The ship speed error scale is a convenient tool that allows the pilot to quickly establish the aircraft on a desired glide path.

Furthermore, the ship speed error scale advantageously informs the pilot if a ship speed error above a predetermined threshold has occurred. The pilot may then take appropriate action (e.g. aborting the landing operation). In such a case, the FPM may be located beyond the "safe" range indicated by the ship speed error scale.

The above described additional HMD symbology is advantageously simple and therefore does not severely clutter the helmet mounted display and thereby confuse the pilot.

The above described additional HMD symbology is advantageously intuitive for the pilot.

Advantageously, the determination of the positions on the display of the above described further SRVV scale, offset feature, and ship speed scale, uses only a few simple additional parameters compared to those used conventionally. These additional parameters tend mostly to be fixed values which tend not to be prone to errors. Apparatus, including the processor, for implementing the above arrangement and performing the above described method steps may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

In the above embodiments, the aircraft is to be landed on an aircraft carrier. However, in other embodiments the aircraft is to be landed on land, on an aircraft, or on a water-based vehicle or amphibious vehicle other than an aircraft carrier.

In the above embodiments, the processor is located onboard the aircraft. However, in other embodiments, at least part of the processor is located remotely from the aircraft, for example, onboard the aircraft carrier.

In some embodiments, the HMD is a display only. However, in other embodiments, feedback from the helmet and/or the HMD, including but not limited helmet tracking devices onboard the aircraft for determining the pilot's head orientation and position within the aircraft cockpit, may be used to determine how the symbology is displayed.

In the above embodiments, symbology for aiding the pilot is displayed to the pilot on a helmet mounted display. However, in other embodiments, the symbology is displayed on a different type of display, for example, a cockpit panel display.

In the above embodiments, the HMD symbology includes the SRVV, the SRVV scale, the FPM, and the horizon bars. However, in other embodiments, the symbology displayed to the pilot includes one or more additional symbology objects instead of or in addition to one or more of those displayed in the above embodiments.

In some embodiments, some or all of the HMD symbology has a different size or shape to that described above. For example, in some embodiments, the SRVV scale is a solid horizontal line across the display and/or the FPM is a cross-hair.

In some embodiments, the HMD symbology displayed to the pilot is to be used in a different way to that described above during the landing operation.

In the above embodiments, the further SRVV is calculated by the processor as described in more detail earlier above and displayed on the helmet mounted display as a horizontal dashed line. However, in other embodiments, the further SRVV scale is determined in a different appropriate way, for example, using one or more different formulae instead of or in addition to those described above. In some embodiments, the further SRVV scale is not a horizontal dashed line, for example, the SRVV scale may be a solid horizontal line across the display.

In the above embodiments, the offset feature is calculated by the processor as described in more detail earlier above and displayed on the helmet mounted display as a V-shaped object. However, in other embodiments, the further SRVV scale is determined in a different appropriate way, for example in some embodiments the offset scale is not indicative of the relative probabilities of the positions of the SRVV scale and, thus, the offset feature may be determined using an appropriately modified process. In some embodiments, the offset feature is not a V-shaped object, for example, the SRVV scale may be a vertical error bar.

In the above embodiments, the ship speed error scale is calculated by the processor as described in more detail earlier above and displayed on the helmet mounted display as a series of dashes/dots. However, in other embodiments, the ship speed error scale is determined in a different appropriate way, for example, using one or more different formulae instead of or in addition to those described above. In some embodiments, the offset feature is not a series of dashes/dots, for example, the SRVV scale may be a vertical bracket within which the position of the FPM is allowed to be varied.

The invention claimed is:

1. A method for displaying an image to a pilot of an aircraft, the method comprising:
    acquiring, by one or more processors operatively linked to a helmet mounted display, a first value, the first value being a measurement of the velocity of the aircraft relative to a runway upon which the aircraft is to be landed;
    displaying, by the helmet mounted display, to the pilot of the aircraft, a first image component, the position of the first image component on the helmet mounted display being dependent upon the first value, said position of the first image component being a horizontal position relative to the helmet mounted display;
    displaying, by the helmet mounted display, to the pilot, a second image component, the second image component being such that, if, from the pilot's point of view, the first image component and the second image component are in a pre-specified configuration on the helmet mounted display, the aircraft is established on a pre-defined glide slope;
    displaying, by the helmet mounted display, to the pilot, a third image component, the position of the third image component on the helmet mounted display being dependent upon the position on the helmet mounted display of the second image component;
    displaying, by the helmet mounted display, to the pilot, a fourth image component, the fourth image component indicating a first position on the helmet mounted display, the first position being such that if, from the pilot's point of view, the third image component is located at the first position, the first image component and the second image component would be in the pre-specified configuration on the helmet mounted display from the pilot's point of view;
    acquiring, by the one or more processors, a second value, the second value being a value for the velocity of the aircraft relative to the runway, the second value being different to the first value; and
    displaying, by the helmet mounted display, to the pilot, a fifth image component, the fifth image component indicating a second position on the helmet mounted display, the second position being such that if, from the pilot's point of view, the third image component is located at the second position, the second image component would be located at a position on the helmet mounted display that it would have if the first image component was calculated using the second value instead of the first value, and, from the pilot's point of view, the first image component and the second image component were in the pre-specified configuration on the helmet mounted display.

2. A method according to claim 1, the method further comprising controlling, by the pilot, the aircraft such that, from the pilot's point of view, the third image component is located at the second position thereby providing that, from the pilot's point of view, the second image component is located at the position on the helmet mounted display that it would have if the first image component was calculated using the second value instead of the first value and, from the pilot's point of view, the first image component and the second image component were in the pre-specified configuration on the helmet mounted display, thereby the establishing the aircraft on a different glide slope.

3. A method according to claim 1, wherein the first image component is a Ship Reference Velocity Vector scale for aiding the pilot to land the aircraft.

4. A method according to claim 1, wherein the first image component is a linear object that extends horizontally across at least part of the helmet mounted display.

5. A method according to claim 1, wherein the second image component is a Ship Reference Velocity Vector for aiding the pilot to land the aircraft.

6. A method according to claim 1, wherein the second value and the first value differ, and wherein a determination of difference is made when the predetermined interval difference is met or exceeded.

7. A method according to claim 1, wherein the step of displaying the first image component comprises:
    providing a measurement, to the one or more processors, of a velocity of the aircraft relative to the Earth;
    providing a measurement, to the one or more processors, of a velocity of the runway relative to the Earth; and
    using the provided measurements, determining, by the one or more processors, a specification for the first image component; and
    using the determined specification, displaying, by the helmet mounted display, to the pilot, the first image component.

8. A method according to claim 1, wherein the step of displaying the fifth image component comprises:
    providing, to the one or more processors, an indication that the first value is incorrect;
    establishing, by the one or more processors, a specification for the fifth image component; and
    in response to the one or more processors receiving the indication, using the established specification, displaying, by the helmet mounted display, to the pilot, the fifth image component.

9. A method according to claim 8 wherein the step of displaying the first image component comprises:
    providing a measurement, to the one or more processors, of a velocity of the aircraft relative to the Earth;

providing a measurement, to the one or more processors, of a velocity of the runway relative to the Earth; and using the provided measurements, determining, by the one or more processors, a specification for the first image component; and using the determined specification, displaying, by the helmet mounted display, to the pilot, the first image component, and wherein the step of establishing, by the one or more processors, the specification for the fifth image component comprises:

modifying, by the one or more processors, the value of the velocity of the runway relative to the Earth; and using the value of the velocity of the aircraft relative to the Earth and the modified value of the velocity of the runway relative to the Earth, establishing, by the one or more processors, the specification for the fifth image component.

10. A method according to claim 8, wherein the step of providing, to the one or more processors, the indication that the first value is incorrect comprises:

controlling, by the pilot, the aircraft such that, from the pilot's point of view, the first image component and the second image component are in the pre-specified configuration on the helmet mounted display, thereby establishing the aircraft on the certain glide slope;

determining, by the pilot, that, while the aircraft is established on the certain glide slope, from the pilot's point of view, the first image component moves with respect to one or more objects or features external to the aircraft; and subsequently providing, to the one or more processors, the indication that the first value is incorrect.

11. A method according to claim 1, wherein the pre-specified configuration is that, from the pilot's point of view, the first image component and the second image component are coincident on the helmet mounted display.

12. Apparatus for displaying an image to a pilot of an aircraft, the apparatus comprising:

one or more processors configured to determine respective specifications for a first image component, a second image component, a third component, a fourth component, and a fifth component; and a helmet mounted display operatively coupled to the one or more processors and configured to display, to the pilot, the first image component, the second image component, the third component, the fourth component, and the fifth component in accordance with the determined specifications; wherein the position of the first image component on the helmet mounted display is dependent upon a first value for the velocity of the aircraft relative to a runway upon which the aircraft is to be landed, said position of the first image component being a horizontal position relative to the helmet mounted display;

the second image component is such that, if, from the pilot's point of view, the first image component and the second image component are in a pre-specified configuration on the helmet mounted display, the aircraft is established on a certain glide slope;

the third image component is such that the position of the third image component on the helmet mounted display is dependent upon the position on the helmet mounted display of the second image component;

the fourth image component indicates a first position on the helmet mounted display, the first position being such that if, from the pilot's point of view, the third image component is located at the first position, the first image component and the second image component would be in the pre-specified configuration on the helmet mounted display from the pilot's point of view;

the fifth image component indicates a second position on the helmet mounted display, the second position being such that if, from the pilot's point of view, the third image component is located at the second position, the second image component would be located at a position on the helmet mounted display that it would have if the first image component was calculated using a second value of the velocity of the aircraft relative to the runway instead of the first value, and, from the pilot's point of view, the first image component and the second image component were in the pre-specified configuration on the helmet mounted display; and the second value is different to the first value.

13. An aircraft comprising apparatus according to claim 12.

14. A program or plurality of programs arranged such that when executed by a computer system or one or more processors it/they cause the computer system or the one or more processors to operate in accordance with the method of claim 1.

15. A machine readable storage medium storing said program or at least one of the plurality of programs according to claim 14.

* * * * *